2,974,120
RUBBER COMPOSITIONS AND PREPARATION THEREOF

Robert E. Miller, Dayton, Ohio, assignor to Monsanto Chemical Company, St. Louis, Mo., a corporation of Delaware No Drawing. Filed Dec. 23, 1957, Ser. No. 704,327

8 Claims. (Cl. 260—45.8)

The present invention is directed to a method of retarding or preventing the deterioration of rubber due to aging or exposure to the atmosphere which involves treating rubber with furoxans. The invention is further directed to rubbers—both natural and synthetic—having furoxans incorporated therein.

An object of the present invention is to provide chemicals for retarding the deterioration of rubber and rubber-like materials which tend to deteriorate due to action of oxygen or ozone in the air. A further object is to provide chemicals which additionally act to improve the resistance of rubber to cracking or tearing when subjected to strain or flexing under atmospheric conditions. A further object is to provide a new class of rubber antidegradants.

The antioxidants or antidegradants utilized in the present invention can be represented by the formula:

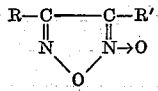

in which R and R′ can be selected from the group consisting of hydrogen; aryl radicals, such as phenyl and substituted phenyl radicals, e.g., phenyl, o-tolyl- p-ethylphenyl, m-isopropylphenyl, o-hydroxylphenyl, nitrophenyl, p-chlorophenyl, etc., and polycyclic aromatics such as naphthyl, anthracyl, etc.; aliphatic groups, particularly saturated or unsaturated aliphatic groups of up to 10 carbon atoms which are hydrocarbon or essentially hydrocarbon in structure, e.g., methyl, ethyl, propyl, isopropyl, butyl, amyl, hexyl, octyl, decyl, and lower alkyl groups in general; allyl, hexene-3-yl, 8-fluorooctyl, etc.; heterocyclic groups, particularly 5- and 6-membered mono-hetero groups, e.g., α-thienyl, β-thienyl, α-furyl, β-furyl, o-pyridyl, etc.; cycloaliphatic groups, e.g., cyclohexyl, cyclopentyl, etc.; and alkaryls and aralkyls, such as, e.g., those resulting from combinations of the aryl and alkyl groups given by way of example above, e.g., β-phenylethyl. As the cyclic furoxan structure is responsible for the antidegradant activity, the actual composition of the R and R′ groups is not too important, although furoxans with some R and R′ groups will have a higher degree of activity than furoxans with other such groups. Some examples of furoxans, all having suitable antidegradant activity, are diphenylfuroxan, 3-p-ethylphenyl-4-phenylfuroxan, di-o-hexylphenylfuroxan, di-n-hexylfuroxan, di-α-naphthylfuroxan, di-cyclohexylfuroxan, di-α-thienylfuroxan, di-α-furylfuroxan, 3-p-methoxyphenyl-4-methylfuroxan, phenylfuroxan, furoxan, etc.

It will be realized that the furoxan compounds utilized herein are sometimes designated as 2,3-epoxy-2,3-dihydrofurazans, furazan-2-oxides, or glyoxime peroxides, and that the subject compounds are sometimes assigned structures other than that set forth herein. It will be understood that the antidegradant activity of the subject compounds is contemplated as within the present invention regardless of how they are named or structurally illustrated.

The furoxans for use in the present invention can be prepared by known procedures, e.g., by oxidizing dioxime compounds to obtain the furoxan structure. Suitable methods of preparing dialkyl, or alkyl-, aryl-furoxans, e.g., are described by R. Scholl, Berichte, 23, 3490–3505 (1890). An excellent procedure for the preparation of diphenylfuroxan is set forth in the example below.

EXAMPLE

Benzaldoxime, 61 grams (0.5 mole) was dissolved in 200 cc. absolute ether and cooled to 3° C. by means of an ice bath. A 92-gram (1 mole) portion of $N_2O_4$ was added dropwise during a 1-hour period at a temperature of about 0°–10° C. Stirring was continued at this temperature for an additional two hours, and the reaction mixture was then treated with 200 cc. of 10% aqueous potassium carbonate solution. The ether solution was decanted and shaken with 1 liter of 10% potassium carbonate until no further color was observed in the alkaline washings. The ether solution was separated and the ether was evaporated, leaving diphenylfuroxan as a yellow solid along with a small amount of red oil; the 24.8 grams of diphenylfuroxan, having a melting point of 114–118° C., represented a conversion of 41.8%. An additional amount of diphenylfuroxan was isolated from the alkaline wash liquors.

The above procedure is readily applicable to the preparation of other diarylfuroxans. The diarylfuroxans, in general, are suitable for use in rubber formulations as described herein; the diarylfuroxans in which the aryl groups are monocyclic are especially suitable for such use.

The following evaluations and the procedures and compositions employed therein are illustrative of the invention, but the invention is not limited thereto.

As representative rubber formulations for the evaluation of the antidegradant properties of furoxans, the following formulations were prepared, all parts being by weight.

|  | A | B | C | D |
|---|---|---|---|---|
| Smoked Sheets | 100 | 100 |  |  |
| GR-S 1500 |  |  | 100 | 100 |
| Carbon Black | 50 | 50 | 50 | 50 |
| Zinc Oxide | 5 | 5 | 4 | 2 |
| Stearic Acid | 3 | 3 | 2 | 4 |
| Plasticizer | 3 | 3 | 10 | 10 |
| Sulfur | 2.5 | 1 | 1.75 | 1.75 |
| Accelerator | 0.5 | 0.5 | 1.2 | 1.2 |
| Sulfasan-R |  | 1.0 |  |  |

As the carbon black in these formulations, the trademarked product, Philblack O was employed; the plasticizer was an asphaltic material—Paraflux. As accelerator, N-cyclohexyl-2-benzothiazylsulfenamide, trademarked Santocure, was employed. GR-S 1500 is a butadiene-styrene polymer resulting from polymerization of butadiene and styrene in molar proportions of about 72/28 (other molar ratios, e.g., 60 to 90/10 to 40 or the like, can be employed). Sulfasan-R is the proprietary name for a vulcanizing agent (4,4′-dithiomorpholine).

Stock A is a conventional natural rubber formulation and Stocks C and D are conventional GR-S formulations.

Stock B is a Sulfasan-R formulation designed to pick up sulfur-sensitive materials. In evaluating the antidegradants, both the furoxan and the controls were employed in an amount of 1.5 parts by weight in the foregoing formulations.

The data in the following table demonstrates the antiozone activity of diphenylfuroxan as compared to two commercial antidegradants. In the relative ozone ratings, Commercial I was taken as 100.

Table I

OZONE RATINGS

| Antidegradant | Formulation | | |
|---|---|---|---|
| | A | B | C |
| Commerical I | 100 | | 100 |
| Commercial II | 75 | | |
| Diphenylfuroxan | 107 | 110 | 112 |

It is thus demonstrated that diphenylfuroxan is not only equivalent to these commercially accepted antidegradants in antiozone activity, but is, in fact, superior in such activity.

The antioxidant activity of diphenylfuroxan was then compared to that of a commercial antidegradant in a molded butadiene-styrene rubber (formulation C) by aging in an air oven for 72 hours at 100° C. The results are reported as percentages of retention of the modulus of elasticity.

|  | Percent |
|---|---|
| Commercial I | 135 |
| Diphenylfuroxan | 135 |

It is thus seen that diphenylfuroxan is comparable to an accepted commercial antidegradant in this test.

The anti-scorch activity of the furoxans is demonstrated by the data in Table II in which the time required to scorch the cured formulations in a Mooney viscosimeter at 135° C. is recorded.

Table II

SCORCH TIME IN MINUTES

| Antidegradant | Formulation | | |
|---|---|---|---|
| | A | B | C |
| Commercial I | 9.9 | | 23.8 |
| Commercial II | 11.3 | | |
| Diphenylfuroxan | 11.5 | 17.6 | 30.8 |

It is apparent that diphenylfuroxan has very good antiscorch activity, the activity in the GR-S formulation being particularly notable.

The resistance to aging of furoxan-treated rubbers is further shown by Goodrich Flexometer tests at 110° C., in which the decrease in size and heat build-up of a 1-inch cured sample are measured after flexing at 1800 cycles per minute; the results are recorded in Tables III and IV below.

Table III

Δ COMPRESSION IN INCHES

| Antidegradant | Formulation | | |
|---|---|---|---|
| | A | B | C |
| Commercial I | 0.085 | | 0.087 |
| Commercial II | 0.098 | | |
| N,N'-dinitroso-N-cyclohexyl- N'-phenyl-p-phenylene diamine | | 0.096 | |
| Diphenylfuroxan | 0.067 | 0.062 | 0.063 |

It is apparent that the rubbers containing diphenylfuroxan have greater dimensional stability than do the formulations containing other antidegradants.

Table IV

TEMPERATURE RISE (ΔT) IN DEGREES CENTIGRADE

| Antidegradant | Formulation | | |
|---|---|---|---|
| | A | B | D |
| Commercial I | 17.5 | | 30 |
| Commercial II | 19.0 | | |
| N,N'-dinitroso-N-cyclohexyl-N'-phenyl-p-phenylene diamine | | 19.0 | |
| Diphenylfuroxan | 16.5 | 14.5 | 23 |

The results clearly indicate there is less heat build-up occurring in rubber formulations stabilized by diphenylfuroxan than in formulations stabilized by the other antidegradants; the diphenylfuroxan stabilized rubber should, therefore, be more resistant to aging in use.

The anti-cutgrowth effect of furoxans is shown by data in the following table in which the flexes to failure of cured samples having a slight cut are indicated in kilocycles; the measurements were made on an India flexing machine at 100° C.

Table V

CUTGROWTH RESISTANCE IN KILOCYCLES

| Antidegradant | Formulation | | |
|---|---|---|---|
| | A | B | D |
| Commercial I | 425 | | 50 |
| Commercial II | 550 | | |
| N,N'-dinitroso-N-cyclohexyl- N'-phenyl-p-phenylene diamine | | 625 | |
| Diphenylfuroxan | 600 | 550 | 50 |

The data indicate that diphenylfuroxan is superior in anti-cutgrowth activity to the accepted commercial antidegradants.

The furoxan-stabilized rubbers have good physical properties, as indicated by the values obtained for diphenylfuroxan-stabilized rubbers which had been cured at 144° C. for 45 minutes, as recorded in Table VI.

Table VI

PHYSICAL PROPERTIES

| Formulation | 300% Modulus (lbs.) | Tensile Strength (lbs./sq. in.) | Elongation (percent) |
|---|---|---|---|
| A | 2,643 | 3,636 | 416 |
| B | 2,656 | 3,873 | 440 |
| D | 1,925 | 3,360 | 490 |

The furoxans will ordinarily be employed in small amount in the rubber formulations, e.g., about 0.5 part to about 3 parts per 100 parts rubber, the parts being by weight; but other amounts can suitably be employed, such as amounts up to 10% or more by weight of the rubber in the formulation. The rubber formulation can also contain plasticizers, vulcanizers, accelerators, curing agents, stabilizers, carbon black or light-colored fillers, etc.

The furoxans can be incorporated into the rubber by various treatments, such as milling, kneading, mixing, masticating, calendering, and the like; or by addition to rubber solutions or dispersions, or by addition to rubber latex before its coagulation. The furoxans can be incorporated before, after, or at the same time as the other components of the rubber formulation.

The rubber formulations containing furoxans can be suitably cured by conventional curing operations, such as, for example, treatment at 30 pounds per square inch steam pressure for up to one or even two hours. Curing temperatures of 120° C. to 160° C. for 30 to 60 minutes are often suitable, e.g., at 144° C. for about 45 minutes. The present invention is considered to include, taken separately or together, the steps of preparing rubber formulations containing furoxans and curing such formulations.

The term rubber as employed herein includes sulfur vulcanizable plastic material which possesses high extensibility under load coupled with the property of forcibly retracting to approximately its original size and shape after the load is removed. Examples of such materials are India rubber, reclaimed rubber, balata, gutta percha, copolymers of butadiene and styrene, butadiene and acrylonitrile, and butadiene and isobutylene, polybutadiene, chloroprene, and other natural or synthetically prepared vulcanizable products, particularly butalastics or those formed in major part from polymerizable diolefins; and other such materials which deteriorate upon aging.

The rubber compositions disclosed herein have valuable utility in the normal uses for which rubber is employed, such as in vehicle tires, conveyor belts, shock absorbers, coating materials, and the like, and have advantages in that they are resistant to aging.

What is claimed is:

1. The vulcanized rubber product obtained by vulcanizing a conjugated diolefin rubber composition containing diphenylfuroxan in an amount from 0.5 to 3 parts for each 100 parts of said rubber, the parts being by weight.

2. A composition comprising a copolymer of butadiene and styrene and a small amount of diphenylfuroxan as an antidegradant, the amount of diphenylfuroxan being from 0.5 to 3 parts for 100 parts of said copolymer, all parts being by weight.

3. The composition of claim 2 in which the butadiene and styrene are in molar proportions of about 60 to 90 parts butadiene to about 10 to 40 parts styrene.

4. A composition comprising natural rubber and a small amount of diphenylfuroxan as an antidegradant, the amount of diphenylfuroxan being from 0.5 to 3 parts for 100 parts of said rubber, all parts being by weight.

5. A rubber composition comprising sulfur vulcanizable conjugated diolefin rubber and 0.5 to 3 parts of diphenylfuroxan for 100 parts of said rubber, all parts being by weight.

6. A sulfur vulcanizable conjugated diolefin rubber containing 0.5 to 3 parts of diarylfuroxan for 100 parts of said rubber, all parts being by weight.

7. A sulfur vulcanizable conjugated diolefin rubber containing 0.5 to 3 parts or di-$\alpha$-furyl furoxan for 100 parts of said rubber, all parts being by weight.

8. A sulfur vulcanizable conjugated diolefin rubber containing 0.5 to 3 parts of di-$\alpha$-thienylfuroxan for 100 parts of rubber, all parts being by weight.

References Cited in the file of this patent
UNITED STATES PATENTS 2,458,780   Howland _____ Jan. 11, 1949

OTHER REFERENCES

Quilico et al.: Chem. Ab., vol. 45, page 606e, (1951).